US008738122B2

(12) United States Patent
Liu et al.

(10) Patent No.: US 8,738,122 B2
(45) Date of Patent: May 27, 2014

(54) SYSTEMS AND METHODS FOR REPRODUCING BODY MOTIONS VIA NETWORKS

(75) Inventors: Yunhui Liu, Hong Kong (CN); Xueyan Tang, Hong Kong (CN); Congyi Lv, Hong Kong (CN); Weilun Poon, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 393 days.

(21) Appl. No.: 12/806,947

(22) Filed: Aug. 23, 2010

(65) Prior Publication Data

US 2011/0071417 A1    Mar. 24, 2011

Related U.S. Application Data

(60) Provisional application No. 61/235,986, filed on Aug. 21, 2009.

(30) Foreign Application Priority Data

Apr. 12, 2010   (CN) .......................... 2010 1 0146127

(51) Int. Cl.
| | |
|---|---|
| *A61B 5/04* | (2006.01) |
| *A61B 5/05* | (2006.01) |
| *A61B 5/103* | (2006.01) |
| *A61B 5/117* | (2006.01) |
| *A63B 69/00* | (2006.01) |
| *G09B 9/00* | (2006.01) |
| *G09B 19/00* | (2006.01) |

(52) U.S. Cl.
USPC ........... 600/546; 600/547; 600/587; 600/595; 434/247; 434/256

(58) Field of Classification Search
USPC ........... 600/546, 547, 587, 595; 434/247, 256
See application file for complete search history.

(56) References Cited

U.S. PATENT DOCUMENTS 3,831,296 A * 8/1974 Hagle ............................ 434/112
4,314,379 A * 2/1982 Tanie et al. ...................... 623/25
(Continued)

FOREIGN PATENT DOCUMENTS

CN             101286196 A        10/2008

OTHER PUBLICATIONS

International Search Report for International Application No. PCT/CN2010/076233, mailed Dec. 16, 2010, 4 pages.

(Continued)

*Primary Examiner* — Rene Towa
*Assistant Examiner* — May Abouelela
(74) *Attorney, Agent, or Firm* — Seed IP Law Group PLLC

(57) ABSTRACT

Disclosed are systems and methods for reproducing a body motion via a network, and systems, devices and methods for identifying a body motion. In an embodiment, the system for reproducing a body motion via a network comprises a sensor configured to capture a surface electromyography signal generated by a body motion of a user at a first terminal in the network; a processor configured to receive the signal from the sensor and identify the body motion based on the received signal, and send information associated with the body motion to a second terminal in the network, the processor being located in the first terminal; and a mechanical member configured to receive the information associated with the body motion from the second terminal and reproduce the body motion based on the received information.

9 Claims, 8 Drawing Sheets
(2 of 8 Drawing Sheet(s) Filed in Color)

(56) References Cited

U.S. PATENT DOCUMENTS

| | | | |
|---|---|---|---|
| 4,408,192 A * | 10/1983 | Ward et al. | 340/407.1 |
| 4,623,354 A * | 11/1986 | Childress et al. | 623/25 |
| 5,252,102 A * | 10/1993 | Singer et al. | 623/24 |
| 5,376,128 A * | 12/1994 | Bozeman, Jr. | 623/24 |
| 5,413,611 A * | 5/1995 | Haslam et al. | 623/25 |
| 5,679,004 A * | 10/1997 | McGowan et al. | 434/247 |
| 6,171,239 B1 * | 1/2001 | Humphrey | 600/372 |
| 6,740,123 B2 * | 5/2004 | Davalli et al. | 623/24 |
| 6,785,574 B2 * | 8/2004 | Kajitani et al. | 600/546 |
| 6,893,407 B1 * | 5/2005 | Brooks et al. | 600/595 |
| 6,952,687 B2 * | 10/2005 | Andersen et al. | 706/12 |
| 7,008,231 B2 * | 3/2006 | Pesnell et al. | 434/247 |
| 7,186,270 B2 * | 3/2007 | Elkins | 623/24 |
| 8,122,772 B2 * | 2/2012 | Clausen et al. | 73/812 |
| 8,126,542 B2 * | 2/2012 | Grey | 600/546 |
| 8,170,656 B2 * | 5/2012 | Tan et al. | 600/546 |
| 8,323,354 B2 * | 12/2012 | Bedard et al. | 623/47 |
| 2001/0014441 A1 * | 8/2001 | Hill et al. | 434/236 |
| 2002/0143405 A1 * | 10/2002 | Davalli et al. | 623/24 |
| 2003/0107608 A1 * | 6/2003 | Hong et al. | 345/863 |
| 2005/0090756 A1 * | 4/2005 | Wolf et al. | 600/546 |
| 2005/0277844 A1 * | 12/2005 | Strother et al. | 600/546 |
| 2006/0015470 A1 * | 1/2006 | Lauer et al. | 706/8 |
| 2006/0071934 A1 | 4/2006 | Sagar et al. | 345/473 |
| 2007/0140562 A1 * | 6/2007 | Linderman | 382/187 |
| 2007/0164985 A1 * | 7/2007 | Jeong et al. | 345/156 |
| 2007/0191743 A1 * | 8/2007 | McBean et al. | 601/5 |
| 2008/0009771 A1 * | 1/2008 | Perry et al. | 600/587 |
| 2008/0058668 A1 * | 3/2008 | Seyed Momen et al. | 600/546 |
| 2008/0253695 A1 * | 10/2008 | Sano et al. | 382/305 |
| 2009/0326406 A1 * | 12/2009 | Tan et al. | 600/546 |
| 2009/0327171 A1 * | 12/2009 | Tan et al. | 706/12 |
| 2010/0016752 A1 * | 1/2010 | Sieracki | 600/544 |
| 2010/0145219 A1 * | 6/2010 | Grey | 600/546 |

OTHER PUBLICATIONS

Written Opinion for International Application No. PCT/CN2010/076233, mailed Dec. 16, 2010, 4 pages.

* cited by examiner

SYSTEMS AND METHODS FOR REPRODUCING BODY MOTIONS VIA NETWORKS

CROSS REFERENCE OF RELATED APPLICATIONS

The present application claims the benefits of U.S. provisional application 61/235,986 filed on Aug. 21, 2009, which is incorporated herein by reference.

TECHNICAL FIELD

The application relates to user interactions in networks, in particular, to system and methods for reproducing human motions via networks.

BACKGROUND

Conventionally, users communicate with each other by using multimedia information such as characters, images, voice, etc., via a network. However, body motions of a user at one end of the network cannot be transmitted to a user at the other end of the network by present communication platforms.

SUMMARY

In a first aspect of the present application, a system for reproducing a body motion via a network is disclosed. The system comprises: a sensor configured to capture a surface electromyography signal generated by a body motion of a user at a first terminal in the network; a processor configured to receive the signal from the sensor and identify the body motion based on the received signal, and send information associated with the body motion to a second terminal in the network, the processor being located in the first terminal; and a mechanical member configured to receive the information associated with the body motion from the second terminal and reproduce the body motion based on the received information.

In a second aspect of the present application, a method for reproducing a body motion via a network is disclosed. The method comprises: capturing a surface electromyography signal generated by a body motion of a user at a first terminal in a network; identifying the body motion based on the signal at the first terminal; sending information associated with the body motion to a second terminal in the network; and reproducing the body motion at the second terminal based on the information.

In a third aspect of the present application, a system for identifying a body motion is disclosed. The system comprises: a sensor configured to capture a surface electromyography signal generated by a body motion; and an identifying module comprising a feature retracting unit and a motion classifying unit. The feature retracting unit is configured to retract a feature signal from the signal received from the sensor. The motion classifying unit configured to identify a body motion corresponding to the extracted feature signal from a plurality of pre-stored motion samples.

In a fourth aspect of the present application, a device for identifying a body motion is disclosed. The device comprises: a feature retracting unit configured to retract a feature signal from a surface electromyography signal generated by a body motion; and a motion classifying unit configured to identify a body motion corresponding to the extracted feature signal from a plurality of pre-stored motion samples.

In a fifth aspect of the present application, a method for identifying a body motion is disclosed. The method comprises: retracting a feature signal from a surface electromyography signal generated by a body motion; and identifying a body motion corresponding to the extracted feature signal from a plurality of pre-stored motion samples.

DRAWINGS

The patent or application file contains at least one drawing executed in color. Copies of this patent or patent application publication with color drawings will be provided by the Office upon request and payment of the necessary fee.

Figure 10:
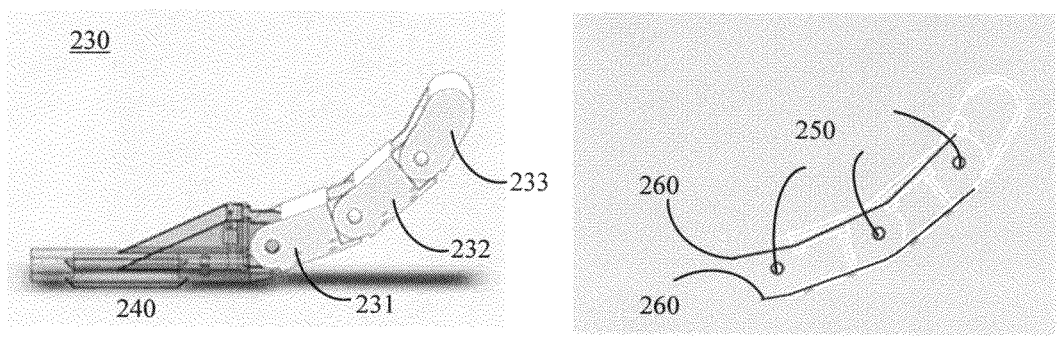
Figure 11:
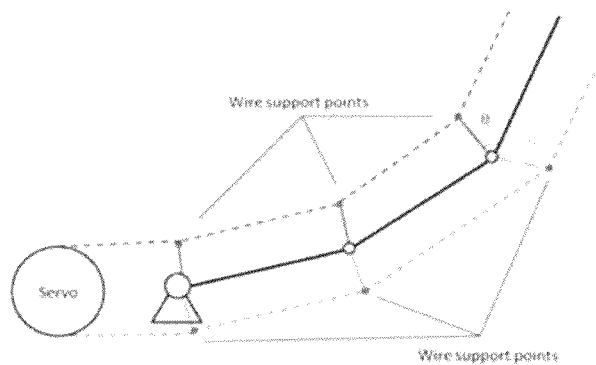
Figure 11:
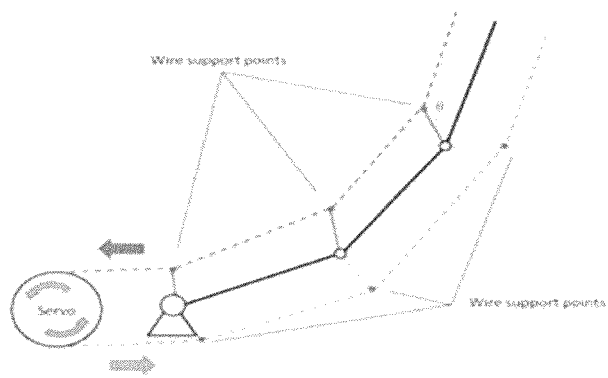

FIGS. 10, 11(a) and 11(b) show a figure in the robot hand according to an embodiment of the present application.

Figure 12:
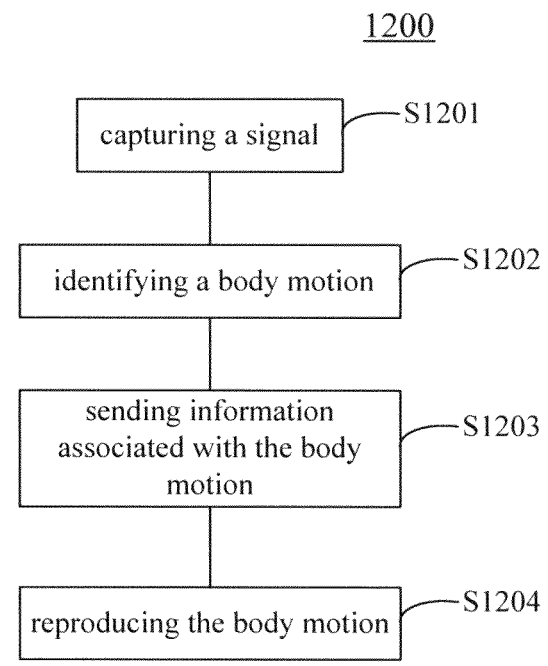

FIG. 12 shows a flowchart of a method for reproducing a body motion via a network according to an embodiment of the present application.

DETAILED DESCRIPTIONS

Hereinafter, embodiments according to the present application are described in detail with reference to accompanying drawings for an illustration purpose.

Figure 1:
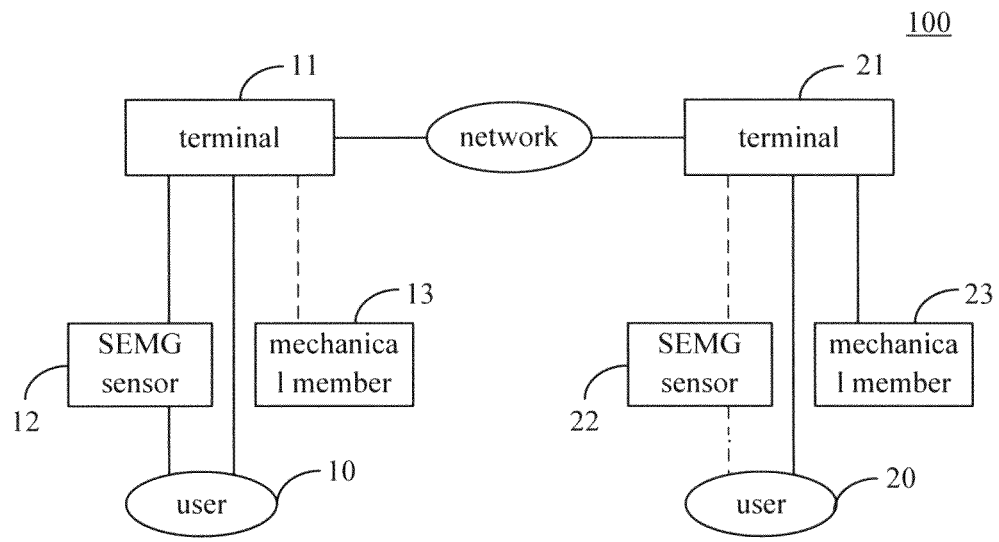
FIG. 1 shows a system for reproducing a body motion via a network according to an embodiment of the present application.

Referring to FIG. 1, a system 100 according to the present application for reproducing body motion via a network is illustrated. For example, the network may be Internet, LAN, WAN, WLAN, GSM, CDMA, and/or 3G, etc. As shown, the system 100 comprise a surface electromyography (sEMG) sensor 12 coupled to a first terminal 11 in the network. The sEMG sensor 12 captures a surface electromyography signal generated by a body motion of a user 10 at the first terminal 11 and transmits the signal to the first terminal 11. A processor (not shown) is provided in the first terminal 11 for identifying the body motion based on the received signal. Information of the body motion is sent from the first terminal 11 to a second terminal 21 in the network. The system 100 further comprises a mechanical member 23 coupled to the second terminal 21. The mechanical member is configured to reproduce the body motion based on the information of the body motion from the second terminal 21.

As shown, the terminals 11 and 12 are operated by the users 10 and 20, respectively, and communicated with each other via the network. The terminals may be any suitable communication terminal in the network, such as a PC, a laptop computer, a cell phone, a PDA, etc.

The sEMG sensor 12 may be worn by the user 10 on his/her skin surface. For example, the sEMG sensor 12 may be worn around the user's wrist. Once a body portion of the user corresponding to the sEMG sensor 12 moves, his/her muscles at the corresponding place contract accordingly so that minor electrical signal is generated there. In response to the user's body movement, such as a hand movement, an electrical signal, i.e., an electromyography signal, caused by the movement of the muscle covered by the sEMG sensor 12 worn on the skin surface is detected by the sEMG sensor 12. The detected electromyography signal may be transmitted from the sEMG sensor 12 to the terminal 11 via a wire or wireless interface.

According to an embodiment, a wireless module is used to transmit the electromyography signal. The wire module may comprise a transmitter arranged at the sEMG sensor 12 and a receiver coupled to the terminal 11. A converter may be provided in the transmitter for converting the received analog sEMG signal into a digital signal so that the digital signal is transmitted to the receiver wirelessly. For example, the transmitter may be implemented by a CC2500 2.4 GHz wireless module and the converter may be implemented by an msp430 converter.

In an embodiment according to the present application, the sEMG sensor may be a wrist sEMG sensing ring worn around a wrist of the user. In this case, referring to FIG. 2, at least four electrodes 201 and thus four channels are provided in the sEMG sensor so as to distinguish different finger movements, since five finger of a human is controlled by four muscle in a forearm thereof. Preferably, six electrodes and thus six channels are provided to ensure that the sEMG sensor is positioned that the signal will be properly detected by the electrodes without knowledge about muscle distribution. The advantage of the six-channel redundant sEMG sensor is robustness to disturbances, such as the alignment of the sEMG detectors.

Figure 2:
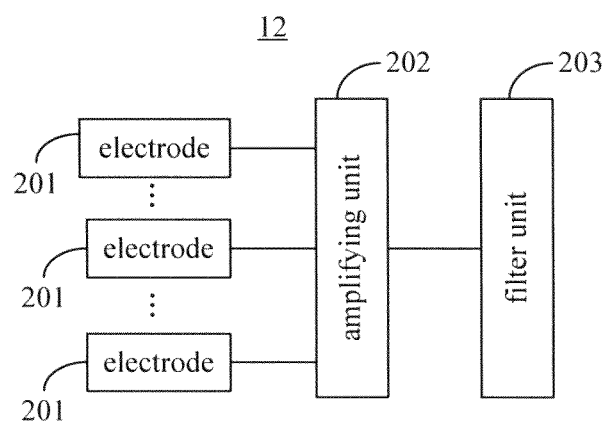
FIG. 2 shows a block view of an sEMG sensor according to an embodiment of the present application.

Since the detected sEMG signal has low amplitudes ranging from fractions of a $\mu V$ to several hundred $\mu V$, an amplifying unit 202 such as a differential amplifier is provided in the sEMG sensor to amplify the signal to the scale of several V, as shown in FIG. 2. In addition, to remove noises from the detected sEMG signal, a filter unit 203 is further provided in the sEMG sensor. Most of useful sEMG signals have a frequency from 20 Hz to 500 Hz, and the filter unit is designed to extract the useful signals. For example, a Sallen-Key high-pass filter may be provided for the signals higher than 20 Hz, and a Butterworth low-pass filter may be provided for the signals lower than 500 Hz. A notch filter for cutting 50 Hz electrical noise may also be provided.

Figure 3:
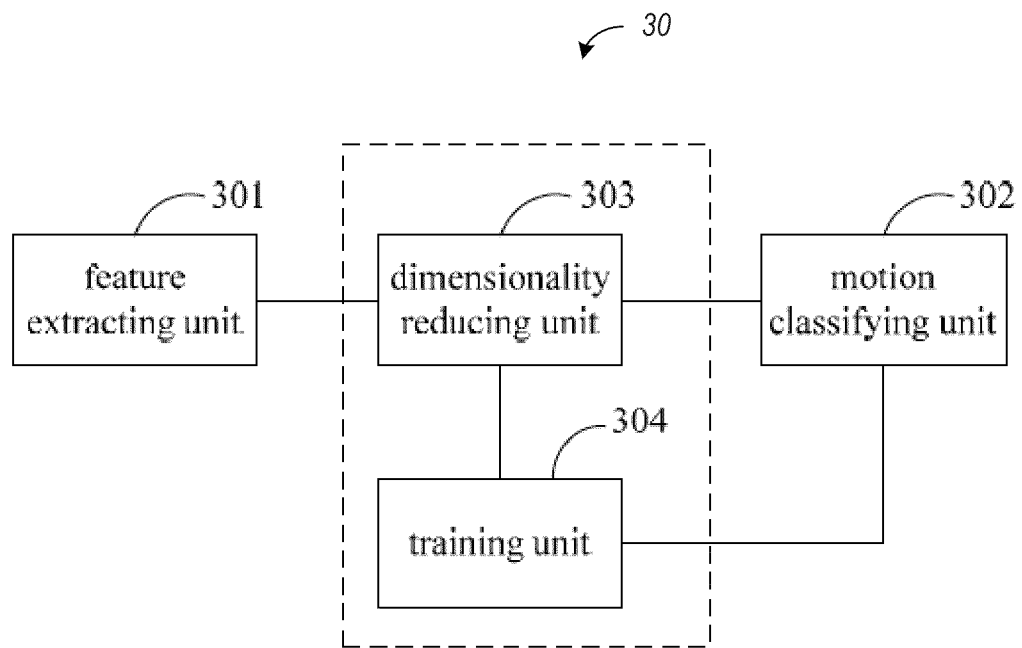
FIG. 3 shows a block view of an identifying module according to an embodiment of the present application.

In an embodiment according to the present application, the processor in the terminal 11 may comprise an identifying module configured to identify the body motion based on the signal received from the sEMG sensor. An illustrated block scheme of the identifying module 30 is shown in FIG. 3.

As shown, the identifying module 30 may comprise a feature extracting unit 301 configured to extract a feature signal from the signal received from the sEMG sensor; and a motion classifying unit 302 configured to identify a body motion corresponding to the extracted feature signal from a plurality of pre-stored motion samples. Optionally, the identifying module 30 may further comprise a dimensionality reducing unit 303 configured to reduce a dimensionality of the extracted feature signal. In this case, the motion classifying unit 302 is configured to identify the body motion based on the signal with a reduced dimensionality. Optionally, the identifying module 30 may further comprise a training unit 304 configured to learn different body motions in advance so as to obtain the plurality of pre-stored motion samples.

In an embodiment, a storing unit (not shown) may be provided in the identifying module 30 to store the plurality of pre-stored motion samples. Alternatively, the storing unit may be provided outside the identifying module 30. Alternatively, the plurality of pre-stored motion samples may be stored in other storage in the terminal 11 or stored in a distributed network.

After the body motion is identified by the identifying module, information associated with the identified body motion is sent to the second terminal via the network. Then, the information is transmitted to the mechanical member in a wire or wireless manner so that the mechanical member reproduces the body motion to a user at the second terminal.

Hereinafter, the processing performed by components of the identifying unit according to the present application will be described in detail with reference to illustrative embodiments.

To identify the body movements, in particular, the hand movements, features distinguishing different types of movements are extracted from the sEMG signal by the feature extracting unit 301. The extracting may be implemented by a temporal method, a spectral method, or a temporal-spectral method. In the temporal method, a square integral feature may be obtained. In the spectral method, a moment and/or a square integral feature obtained based on a Fourier transform. In the temporal-spectral method, a moment and/or a square integral feature may be obtained based on the short-time Fourier transform (STFT).

Figure 4:
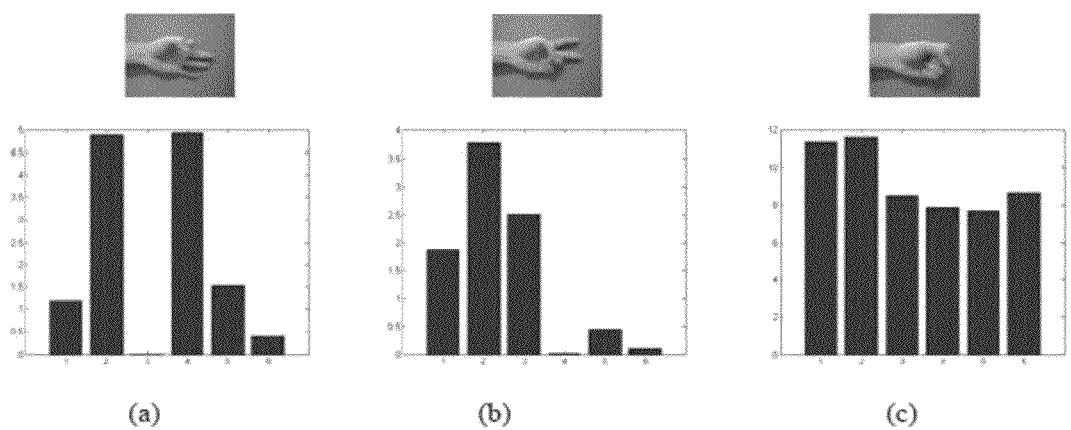
FIGS. 4a-4c show spectral moment features of six-channel signals for three different kinds of hand movement according to an embodiment of the present application.

FIGS. 4a-4c illustratively show spectral moment features extracted from six-channel signals obtained from sEMG sensor in response to three types of hand movement, respectively. As shown, different spectral moment features are obtained according to different hand movements. These spectral moment features may be directly used for the further motion classification. However, the values of the spectral moment features may vary with amplitude of a force applied by the user. But the spectral moment feature ratios of the different channels for the same movements keep stable, regardless of exerted forces. Thus, differences among the six-channel signals may be used for distinguishing different hand movements. For example, ratios of the spectral moment features obtained from the six-channel signals may be used in the following classification for distinguishing different hand movements.

According to the extracted features, the motion classifying unit may identify the corresponding body motion from a plurality of pre-stored motion samples based on the extracted features and then information associated with the body motion may be sent to the second terminal to instruct the mechanical member to reproduce the corresponding body motion. The plurality of pre-stored motion samples may be stored in a storage unit inside or outside the identifying module. Alternatively, the plurality of pre-stored motion samples may be stored in a distributed network. Each of the plurality of pre-stored motion samples may comprise information associated with a body motion and its corresponding features. Each body motion may be indicated by the information associated therewith.

Figure 5:
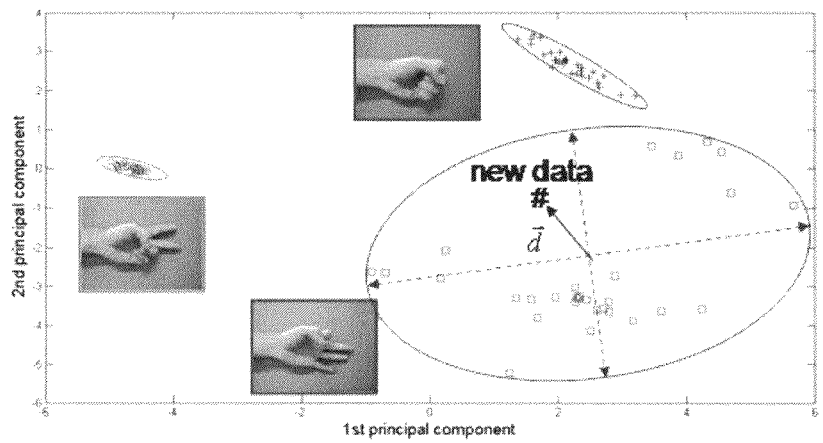
FIG. 5 shows projected features and trained clusters according to an embodiment of the present application.

As stated above, in embodiments with the six-channel sEMG sensor, each body movement is characterized by six features extracted from six sEMG electric signals. In an embodiment, a principal component analysis (PCA) may be employed to reduce a dimension size of the features so as to reduce the amount of computation to be performed. Using the PCA, the features extracted from the six-channel sEMG signals are projected on a 2-dimensional plane as shown in FIG. 5. Discrete dots in FIG. 5 represent the projected features.

In this case, each of the plurality of pre-stored motion samples may comprise information associated with a body motion and its corresponding features with a reduced dimensionality. The motion classifying unit may identify the corresponding body motion based on the extracted features with the reduced dimensionality.

According to an embodiment, a training unit may be provided. In this case, the pre-stored samples may be obtained by the training unit learning different body motions. For example, a training method based on the Mahalanobis distance may be used. This method is a statistical method. In this method, 2-dimensional projected features obtained by PCA are clustered using the Mahalanobis distance. As shown in FIG. 5, discrete projected features for a same hand movement are enveloped with an eclipse based on the Mahalanobis distance. Each eclipse represents one kind of the hand movements.

Thus, to recognize a new hand movement represented by # in FIG. 5, the motion classifying unit calculates Mahalanobis distances of input 2-dimensional features to centers of the clusters obtained by the training/learning. The cluster with a minimum distance of d to the input feature is the result. This statistical method is computationally efficient and hence is suitable for real-time training and recognition. This approach demonstrated high success rate of hand motion recognition.

Besides the type of a hand movement, an exerted force and a speed of the movement are also important. The force and the speed impact the obtained signal and thus the extracted feature. According to an embodiment, in the training and identification, amplitude of the exerted force and/or the speed of the movement may be considered.

Figure 6:
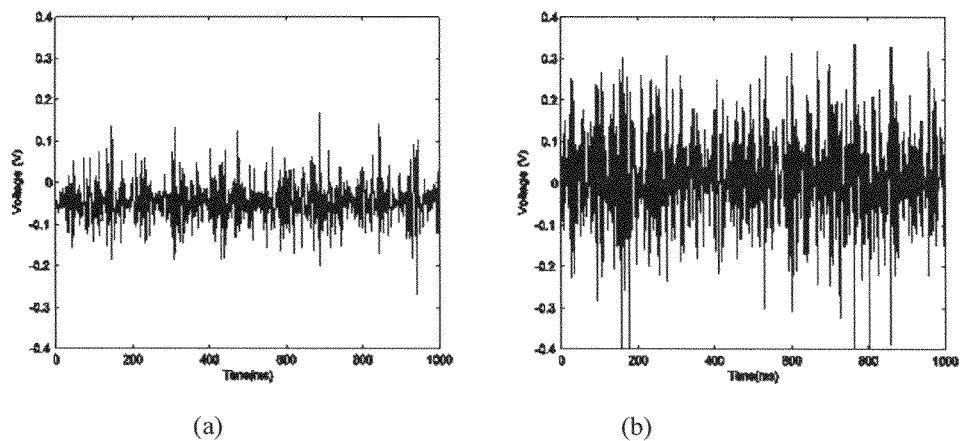
FIGS. 6a-6b show sEMG signals with small and large forces, respectively, according to an embodiment of the present application.
Figure 7:
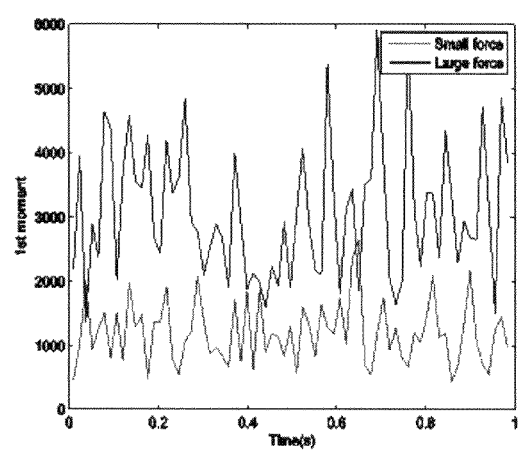
FIG. 7 shows moment features based on STFT with small and large forces according to an embodiment of the present application.

The temporal, spectral and temporal-spectral methods may also be used to distinguish different force levels. For example, FIGS. 6a and 6b show the sEMG signals captured under different force levels. As can be seen, the amplitude difference is significant. Therefore, the features may also describe the exerted force. As a feasible method, the moment features based on the STFT results are given in FIG. 7. The upper curve shows the moment feature obtained when a large force is applied and the lower curve shows the moment feature obtained when a small force is applied. Accordingly, when samples are collected in the training process, the relationship of obtained features and exerted forces is considered. Then, when the identification is performed based on extracted features, the exerted force can also be determined.

Figure 8:
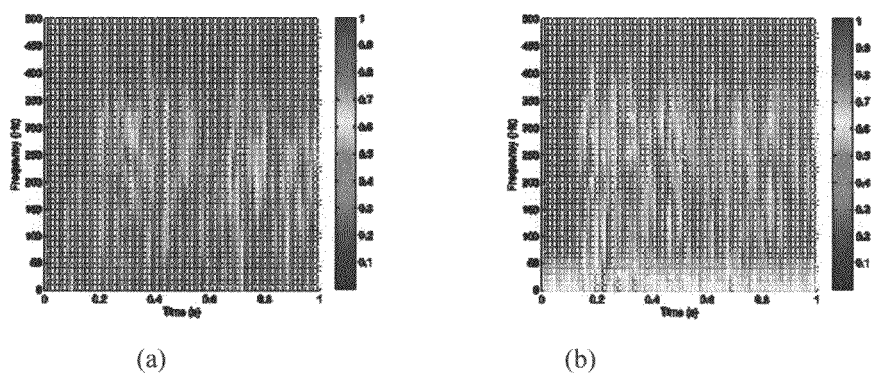
FIGS. 8a-8b show STFT results with low and fast speeds according to an embodiment of the present application.
Figure 9:
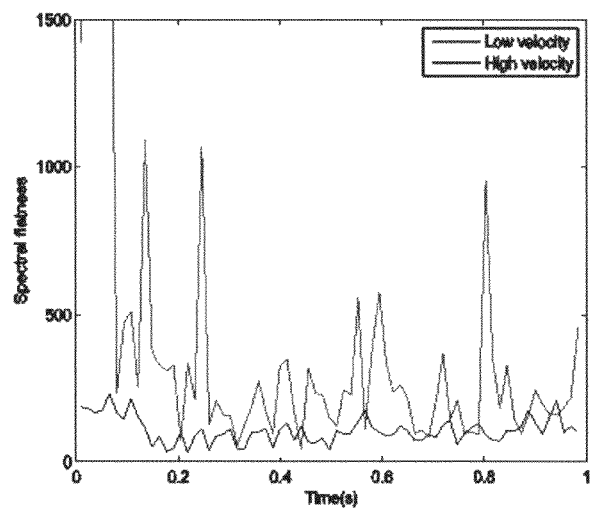
FIG. 9 shows flatness features with low and fast speeds according to an embodiment of the present application.

Similarly, the speed information is hidden in transient features, which can be extracted by a STFT method. The basic idea of the STFT method is to divide the signal into short segments in the time domain and then apply the Fourier transform to each segment. Compared with the traditional FFT, the STFT method is able to capture more features of the transient movements and make it possible to identify a velocity of the movement. Based on a result of the STFT, a Flatness feature may be determined to describe an energy distribution in both time and frequency domains and to distinguish different movement speeds. Accordingly, when samples are collected in the training process, the relationship of obtained features and speeds is considered. Then, when the identification is performed based on extracted features, the corresponding speed can also be determined. An example is shown in FIGS. 8a-8b and 9, in which features obtained for hand grasping with slow and fast speed are illustrated, respectively.

When the body motion is identified, information associated with the body motion is sent to the second terminal via the network. Then, the second terminal transmits the information to the mechanical member coupled thereto. The information may be transmitted from the second terminal to the mechanical member via a wire or wireless communication. According to an embodiment, the information is transmitted via a wireless module similar to that used to communicate between the sEMG sensor and the first terminal as discussed above. That is, a transmitter is arranged to be coupled to the second terminal and a receiver is arranged to be coupled to the mechanical member.

According to an embodiment, the mechanical member is a robot hand with a palm, five fingers and a driving unit for the five fingers. Each finger is driven by a coupled mechanism. Similar to a human hand, as shown in FIG. 10, each finger 230 comprises a first phalange 231, a second phalange 232, a third phalange 233, three rotary joints 250, and a tension part 260 connected to the driving unit and the three rotary joints. One of the three rotary joints connects the first phalange to the second phalange; one of the three rotary joints connects the second phalange to the third phalange; and the other one of the three rotary joints connects the third phalange to the palm 240. The tension part 260 rotates the three phalanges via the three rotary joints under a driving force of the driving unit.

According to an embodiment, the driving unit may comprise four servo motors, one of which drives a ring finger and a little finger, and the other three of which drive a thumb, an index finger and a middle finger, respectively. Based on the received information, the robot hand instructs the driving unit to rotary one or more of the five fingers.

According to an embodiment, the tension part 260 comprises two wires connected to one servo motor. As shown in FIGS. 10, 11(a) and 11(b), one wire is placed at the front side of the finger while the other is placed at the back of the finger. When the servo motor rotated, the two wires will experience a contraction and extension force respectively. This contraction and extension will generate torques at the three rotary joints, exerted by the forces on the three wire support points. The three rotary joints rotate under application of the torques, as shown in FIG. 11(b). Once the servo motor reverses its rotation direction, the motion of the finger may reserve from bending to extension.

The mechanical member may further comprise an arm, in which servo motors may be placed. At the bottom of the arm, a battery case may be placed for holding the batteries as well as the circuit block for receiving signals. In addition, the mechanical member may be coated for better sense of touch.

Referring to FIG. 12, a method 1200 for reproducing a body motion via a network is also provided in the present application. According to the method, at step S1201, a surface electromyography signal generated by a body motion of a user at a first terminal in a network is captured. At step S1202, the body motion is identified based on the signal at the first terminal. At step S1203, information associated with the body motion is sent to a second terminal in the network. At step S1204, the body motion is reproduced at the second terminal based on the information.

According to an embodiment, the identifying step S1202 may comprises sub-steps of retracting a feature signal from the captured signal; and identifying a body motion corresponding to the extracted feature signal from a plurality of pre-stored motion samples. The plurality of pre-stored motion samples may be obtained by learning different body motions in advance.

According to an embodiment, the method may further comprise a step of reducing a dimensionality of the extracted feature signal before the step of identifying, wherein the extracted features signal may be a square integral or a moment obtained from the sEMG signal.

Since the steps have been discussed hereinabove with reference to the system 100, detailed descriptions thereof are omitted.

Hereinabove, illustrative embodiments according to the present application are described with reference to the accompany drawings. However, as obvious for those skilled in the art, it is not necessary to contain all elements mentioned above in one solution. Any suitable combination of the described elements may be combined to implement the present application.

U.S. provisional patent application Ser. No. 61/235,986 filed Aug. 21, 2009, and Chinese patent application Serial No. 201010146127.6 filed Apr. 12, 2010 are each incorporated herein by reference in their entirety.

The invention claimed is:

1. A method for reproducing a body motion via a network system, the system including a first terminal and a second terminal that communicates with the first terminal via a network, the method comprising: responsive to capturing, by the first terminal, a first surface electromyography signal generated by a first body motion of a first user: identifying the first body motion based on the first signal captured by the first terminal; sending first information associated with the first body motion to the second terminal via the network; and reproducing the first body motion via a first robot hand at the second terminal based on the first information, and responsive to capturing, by the second terminal, a second surface electromyography signal generated by a second body motion of a second user: identifying the second body motion based on the second signal captured by the second terminal; sending second information associated with the second body motion to the first terminal via the network; and reproducing the second body motion via a second robot hand at the first terminal based on the second information.

2. The method of claim 1, wherein the identifying of the first body motion based on the first signal captured by the first terminal comprises:
extracting a feature signal from the first signal captured by the first terminal; and
identifying the first body motion corresponding to the extracted feature signal from a plurality of pre-stored motion samples.

3. The method of claim 2, wherein the plurality of pre-stored motion samples are obtained by learning different body motions in advance.

4. The method of claim 2, further comprising:
reducing a dimensionality of the extracted feature signal before the first body motion is identified based on the first signal captured by the first terminal.

5. The method of claim 2, wherein the feature signal includes a square integral feature or a moment feature.

6. The method of claim 1, wherein the identifying of the second body motion based on the second signal captured by the second terminal comprises:
extracting a feature signal from the second signal captured by the second terminal; and
identifying the second body motion corresponding to the extracted feature signal from a plurality of pre-stored motion samples.

7. The method of claim 6, wherein the plurality of pre-stored motion samples are obtained by learning different body motions in advance.

8. The method of claim 6, further comprising:
reducing a dimensionality of the extracted feature signal before the second body motion is identified based on the second signal captured by the second terminal.

9. The method of claim 6, wherein the feature signal includes a square integral feature or a moment feature.

* * * * *